US011559796B2

(12) United States Patent
Zhang

(10) Patent No.: US 11,559,796 B2
(45) Date of Patent: Jan. 24, 2023

(54) METHODS FOR PRODUCING HIERARCHICAL MESOPOROUS BETA ZEOLITE

(71) Applicant: Saudi Arabian Oil Company, Dhahran (SA)

(72) Inventor: Ke Zhang, Stoneham, MA (US)

(73) Assignee: Saudi Arabian Oil Company, Dhahran (SA)

(*) Notice: Subject to any disclaimer, the term of this patent is extended or adjusted under 35 U.S.C. 154(b) by 141 days.

(21) Appl. No.: 16/940,553

(22) Filed: Jul. 28, 2020

(65) Prior Publication Data
US 2022/0032275 A1 Feb. 3, 2022

(51) Int. Cl.
*B01J 29/70* (2006.01)
*B01J 35/10* (2006.01)
*B01J 37/04* (2006.01)
*B01J 37/30* (2006.01)
*C01B 39/46* (2006.01)
*C01B 39/02* (2006.01)

(52) U.S. Cl.
CPC ....... *B01J 29/7007* (2013.01); *B01J 35/1023* (2013.01); *B01J 35/1038* (2013.01); *B01J 35/1061* (2013.01); *B01J 37/04* (2013.01); *B01J 37/30* (2013.01); *C01B 39/026* (2013.01); *C01B 39/46* (2013.01); *B01J 2229/14* (2013.01); *B01J 2229/37* (2013.01); *B01J 2229/38* (2013.01); *C01P 2006/12* (2013.01); *C01P 2006/14* (2013.01); *C01P 2006/16* (2013.01)

(58) Field of Classification Search
CPC ............... B01J 29/7007; B01J 35/1023; B01J 35/1038; B01J 35/1061; B01J 37/04; B01J 37/30
See application file for complete search history.

(56) References Cited

U.S. PATENT DOCUMENTS

| | | | |
|---|---|---|---|
| 5,601,798 | A | 2/1997 | Cooper et al. |
| 5,871,650 | A | 2/1999 | Lai et al. |
| 6,620,402 | B2 | 9/2003 | Jacobsen et al. |
| 8,486,369 | B2 | 7/2013 | Garcia-Martinez et al. |
| 8,951,498 | B2 | 2/2015 | Larsen et al. |
| 9,580,328 | B2 | 2/2017 | Martinez et al. |
| 10,118,163 | B1 | 11/2018 | Zhang |
| 2007/0227351 | A1 | 10/2007 | Garcia-Martinez |

OTHER PUBLICATIONS

Zhang et al. ACS Omega, (2018), v.3, p. 18935-18942. (Disclosed in IDS).*
Wang et al., Microporous and Mesoporous Materials, (2015), v.206, p. 42-51. (Disclosed in IDS).*
Ding et al., "LCO hydrotreating with Mo—Ni and W—Ni supported on nano- and micro-sized zeolite beta", Applied Catalysis A: General 353, pp. 17-23 (2009).
Li et al., "Realizing the Commercial Potential of Hierarchical Zeolites: New Opportunities in Catalytic Cracking", ChemCatChem, vol. 6, pp. 46-66 (2014).
Mitchell et al., "Structural analysis of hierarchically organized zeolites", Nature Communications, DOI: 10.1038/ncomms9633, pp. 1-14, Oct. 20, 2015.
Verboekend et al., "Mesopore Formation in USY and Beta Zeolites by Base Leaching: Selection Criteria and Optimization of Pore-Directing Agents", Crystal Growth & Design, vol. 12, pp. 3123-3132 (2012).
Verboekend et al., "Hierarchical Y and USY Zeolites Designed by Post-Synthetic Strategies", Adv. Funct. Mater., vol. 22, pp. 916-928 (2012).
Zhang et al., "Optimization of Hierarchical Structures for Beta Zeolites by Post-Synthetic Base Leaching", Ind. Eng. Chem. Res, vol. 55, pp. 8567-8575 (2016).
Moeller et al., "Mesoporosity—a new dimension for zeolites", Chem. Soc. Rev., vol. 42, pp. 3689-3707 (2013).
Liu, J. et al.; Alkaline-Acid Treated Mordenite and Beta Zeolites Featuring Mesoporous Dimensional Uniformity; Materials Letters; Jun. 14, 2014; pp. 78-81; vol. 132; Elsevier.
Perez-Ramirez, J. et al.; Tailored Mesoporosity Development in Zeolite Crystals By Partial Detemplation and Desilication; Advanced Functional Materials; Jan. 9, 2009; pp. 1640172; vol. 19, No. 1; Wiley-VCH GmbH & Co.
Dos Santos, L.R.M. et al; Creation of Mesopores and Structural Re-Organization in Beta Zeolite During Alkaline Treatment; Microporous and Mesoporous Materials; Feb. 4, 2016; pp. 260-266; vol. 226; Elsevier.
Groen, J.C. et al.; On the Introduction of Intracrystalline Mesoporosity in Zeolites Upon Desilication in Alkaline Medium; Microporous and Mesoporous Materials; Apr. 8, 2004; pp. 29-34; vol. 69, No. 1-2; Elsevier Inc.
International Search Report and Written Opinion pertaining to Application No. PCT/US2017/056085 dated Feb. 16, 2018.
Groen et al. "Mesoporous beta zeolite obtained by desilication" Micorporous and Mesoporous Materials 114 (2008) 93-102, 10 pgs.
Debaerdemaeker et al. "Catalytic applications of OSDA-free Beta zeolite" (2013) Journal of Catalysis, 308, 73-81, 27 pgs.

(Continued)

*Primary Examiner* — Yong L Chu
(74) *Attorney, Agent, or Firm* — Dinsmore & Shohl LLP

(57) ABSTRACT

A method for producing a hierarchical mesoporous beta includes mixing a beta zeolite with an aqueous metal hydroxide solution and heating the beta zeolite and the aqueous metal hydroxide mixture to produce a desilicated beta zeolite, contacting the desilicated beta zeolite with an ammonium salt solution to produce an intermediate hierarchical mesoporous beta zeolite, and treating the intermediate hierarchical mesoporous beta zeolite with an acidic solution to produce the hierarchical mesoporous beta zeolite. The hierarchical mesoporous beta zeolite includes a molar ratio of silicon to aluminum of greater than 12.5, a total pore volume of greater than or equal to the total pore volume of the intermediate hierarchical mesoporous beta zeolite, and an average mesopore size of greater than or equal to the average mesopore size of the hierarchical mesoporous beta zeolite. The method may also include calcining the intermediate hierarchical mesoporous beta zeolite.

14 Claims, No Drawings

(56) References Cited

OTHER PUBLICATIONS

Ji et al. "Organic-Free Synthesis of CHA-Type Zeolite Catalysts for the Methanol-to-Olefins Reaction" ACS Catal. 2015, 5, 4456-4465, 10 pgs.
Otomo et al. "OSDA-Free Zeolite Beta with High Aluminum Content Efficiently Catalyzes a Tandem Reaction for Conversion of Glucose to 5-Hydroxymethylfurfural" ChemCatChem 2015, 7, 4180-4187, 8 pgs.
Otomo et al. "Development of a post-synthetic method for tuning the Al content of OSDA-free Beta as a catalyst for conversion of methanol to olefins" Catal. Sci. Technol., 2016, 6, 713-721, 9 pgs.
Wang et al. "Dealumination of organic structure-directing agent (OSDA) free beta zeolite for enhancing its catalytic performance in n-hexane cracking" Microporous and Mesoporous Materials 220 (2016) 275-281, 7 pgs.
Yilmaz et al. "A new catalyst platform: zeolite Beta from template-free synthesis" Catal. Sci. Technol., 2013, 3, 2580-2586, 8 pgs.
International Search Report and Written Opinion dated Apr. 6, 2021 pertaining to International application No. PCT/US2021/012239 filed Jan. 6, 2021, 19 pgs.
Zhang, Ke et al. "Exploring the impact of synthetic strategies on catalytic cracking in hierarchical beta zeolites via hydrothermal desilication and organosilane-templated synthesis" Catalysis Science & Technology, vol. 10, No. 14, Jun. 25, 2020, pp. 4602-4611.
Wang, Y et al. "Effect of post treatment on the local structure of hierarchical Beta prepared by desilication and the catalytic performance in Friedel-Crafts alkylation" Microporous and Mesoporous Materials, vol. 206, Dec. 23, 2014, pp. 42-51.
Zhang, Ke et al. "Organotemplate-Free beta Zeolites: From Zeolite Synthesis to Hierarchical Structure Creation" ACS Omega, vol. 3, No. 12, Dec. 31, 2018, pp. 18935-18942.

* cited by examiner

METHODS FOR PRODUCING HIERARCHICAL MESOPOROUS BETA ZEOLITE

BACKGROUND

Field

The present disclosure generally relates to methods for producing zeolites, more specifically, to methods for producing hierarchical mesoporous beta zeolites.

Technical Background

Zeolites are crystalline aluminosilicates constructed from aluminate ($AlO_4$) and silicate ($SiO_4$) tetrahedra with various framework structures that are extensively applied in adsorption, catalysis, and separation. Generally, conventional zeolites are composed of 8, 10, or 12-membered-ring pore channels with a micropore size of less than 1 nanometer (nm). Due to their excellent stability, strong acidity, and regular pore sizes, zeolites are of great importance to industrial catalysis as heterogeneous catalysts in petrochemical and chemical conversion processes. However, when large chemical species with sizes similar with or greater than the dimensions of the pores in zeolites are involved in a catalytic conversion, the active sites in zeolites tend to become inaccessible due to strong diffusion limitations or molecular rejection induced by the relatively rigid zeolite micropore structure, which results in a less effective use of zeolite catalysts. Moreover, the diffusion limitation of reaction products or intermediates also increases the possibility of coking or changes in desired product distribution.

SUMMARY

Accordingly, ongoing needs exist for producing zeolites having a hierarchical pore structure to allow access to catalytically active sites by larger chemical compounds. In particular, there is an ongoing need for methods for producing hierarchical mesoporous beta zeolites that result in a hierarchical mesoporous beta zeolite exhibiting certain characteristics, such as an increased molar ratio of silicon to aluminum, while also maintaining various other characteristics, such as but not limited to total pore volume, average mesopore size, or both. The present disclosure is directed to methods for producing a hierarchical mesoporous beta zeolite having an increased molar ratio of silicon to aluminum in addition to maintaining or even increasing its total pore volume, average mesopore size, or both. These hierarchical mesoporous beta zeolites may feature greater stability during catalytic use compared to conventional low-silica hierarchical zeolites, among other features.

According to one or more aspects of the present disclosure, a method for producing a hierarchical mesoporous beta zeolite may include mixing a beta zeolite with an aqueous metal hydroxide solution. The method may further include heating the beta zeolite and the aqueous metal hydroxide mixture at a temperature of greater than or equal to 100° C., wherein the heating causes desilication of the beta zeolite to produce a desilicated beta zeolite. The method may further include contacting the desilicated beta zeolite with an ammonium salt solution to produce an intermediate hierarchical mesoporous beta zeolite having (a) a molar ratio of silicon to aluminum of less than 12.5, (b) a total pore volume of greater than or equal to 0.3 $cm^3/g$, and (c) an average mesopore size of greater than 8 nm, wherein the contacting causes ion exchange of sodium ions with ammonium ions in the intermediate hierarchical mesoporous beta zeolite. The method may further include treating the intermediate hierarchical mesoporous beta zeolite with an acidic solution to produce the hierarchical mesoporous beta zeolite that includes (e) a molar ratio of silicon to aluminum of greater than 12.5, (f) a total pore volume of greater than or equal to the total pore volume of the intermediate hierarchical mesoporous beta zeolite, and (g) an average mesopore size of greater than or equal to the average mesopore size of the hierarchical mesoporous beta zeolite.

In one or more additional aspects of the present disclosure, a method for increasing a molar ratio of silicon to aluminum in a hierarchical mesoporous beta zeolite may include contacting a beta zeolite having a hierarchical mesoporous structure with an ammonium nitrate solution having a molarity from 0.1 M to 1.0 M at a temperature from 25° C. to 100° C. for a time of greater than or equal to 1 hour to produce an intermediate hierarchical mesoporous beta zeolite having (a) a molar ratio of silicon to aluminum of less than 12.5, (b) a total pore volume of greater than or equal to 0.3 $cm^3/g$, and (c) an average mesopore size of greater than 8 nm, wherein contacting causes ion exchange of sodium ions with ammonium ions in the hierarchical mesoporous beta zeolite. The method may further include calcining the intermediate hierarchical mesoporous beta zeolite at a temperature of greater than or equal to 500° C. for a time of greater than or equal to 1 hour. The method may further include treating the intermediate hierarchical mesoporous beta zeolite with an acidic solution having a molarity from 0.1 M to 1.0 M at a temperature from 25° C. to 100° C. for a time of greater than or equal to 1 hour to produce the hierarchical mesoporous beta zeolite that includes (e) a molar ratio of silicon to aluminum of greater than 12.5, (f) a total pore volume of greater than or equal to the total pore volume of the hierarchical mesoporous beta zeolite, and (g) an average mesopore size of greater than or equal to the average mesopore size of the hierarchical mesoporous beta zeolite.

In one or more additional aspects of the present disclosure, a method for increasing a molar ratio of silicon to aluminum in a hierarchical mesoporous beta zeolite may include contacting a beta zeolite having a hierarchical mesoporous structure with an ammonium nitrate solution to produce an intermediate hierarchical mesoporous beta zeolite comprising (a) a molar ratio of silicon to aluminum of less than 12.5, (b) a total pore volume of greater than or equal to 0.3 $cm^3/g$, and (c) an average mesopore size of greater than 8 nm, wherein contacting causes ion exchange of sodium ions with ammonium ions in the hierarchical mesoporous beta zeolite. The method may further include treating the intermediate hierarchical mesoporous beta zeolite with an acidic solution to produce the hierarchical mesoporous beta zeolite comprising (e) a molar ratio of silicon to aluminum of greater than 12.5, (f) a total pore volume of greater than or equal to the total pore volume of the hierarchical mesoporous beta zeolite, and (g) an average mesopore size of greater than or equal to the average mesopore size of the hierarchical mesoporous beta zeolite.

Additional features and advantages of the technology described in the present disclosure will be set forth in the detailed description which follows, and in part will be readily apparent to those skilled in the art from the description or recognized by practicing the technology as described in the present disclosure, including the detailed description which follows and the claims.

DETAILED DESCRIPTION

The present disclosure is directed to methods for producing hierarchical mesoporous beta zeolites. The methods may include mixing the beta zeolite with an aqueous metal hydroxide solution and heating the beta zeolite and the aqueous metal hydroxide mixture to produce a desilicated beta zeolite. The methods may further include contacting the desilicated beta zeolite with an ammonium salt solution to produce an intermediate hierarchical mesoporous beta and treating the intermediate hierarchical mesoporous beta zeolite with an acidic solution to produce the hierarchical mesoporous beta zeolite. The methods may also include calcining the intermediate hierarchical mesoporous beta zeolite.

The various methods of the present disclosure for producing hierarchical mesoporous beta zeolites may provide hierarchical mesoporous beta zeolites having increased molar ratios of silicon to aluminum compared to methods used to produce hierarchical mesoporous beta zeolites that only include a desilication process. Additionally, the various methods of the present disclosure may provide hierarchical mesoporous beta zeolites having increased molar ratios of silicon to aluminum and preserved total pore volumes and average mesopore sizes.

As used in the present disclosure, the "average mesopore size" of a hierarchical mesoporous beta zeolite may refer to the average mesopore size determined by Barrett-Joyner-Halenda (BJH) analysis. BJH analysis measures the amount of a gas (argon) that detaches from a material, such as the hierarchical mesoporous zeolite support, at 87 Kelvin over a range of pressures. Using the Kelvin equation, the amount of argon adsorbate removed from the pores of the material and the relative pressure of the system can be used to calculate the average pore size of the material.

As used in the present disclosure, the "total pore volume" of a hierarchical mesoporous beta zeolite may refer to the total pore volume determined by Non-Local Density Functional Theory (NLDFT) analysis. NLDFT analysis measures the amount of rough surface area of crystalline silica materials, such as beta zeolites.

As used in the present disclosure, the term "microporous" refers to a material, such as a zeolite, having pores with an average pore size of less than 2 nanometers (nm).

As used in the present disclosure, the term "mesoporous" refers to a material, such as a zeolite, having pores with an average pore size of from 2 nm to 50 nm.

As used in the present disclosure, the term "desilicated beta zeolite" is intended to refer to a beta zeolite in which at least some portion of the silica is removed through a desilication process and is not intended to imply that all the silica is removed.

As previously discussed, microporous beta zeolites may have average pores sizes less than 2 nm, which may inhibit access to catalytically active sites on the beta zeolite to larger molecules, which may have a molecular size equal to or greater than the average pore size of the microporous beta zeolite. To increase access to these larger molecules, zeolites may be converted into hierarchical zeolites to introduce at least one additional pore system, such as a pore system in the mesoporous range (mesoporous zeolites). Beta zeolite is one such zeolite that may be converted into a hierarchical beta zeolite. Hierarchical beta zeolites may include both micropores having a pore size of less than 1 nm and mesopores having a pore size of from 2 nm to 50 nm. Hierarchical beta zeolites may exhibit stability at elevated temperatures, such as temperatures greater than 250° C., and the acid sites of hierarchical beta zeolites may be compatible with hydrocracking reactions, which are helpful to break up a hydrocarbon feed or a hydrocarbon fraction into smaller molecules. Hydrocarbon feedstocks that include larger hydrocarbon molecules for hydrocracking reactions using hierarchical beta zeolites may include, but are not limited to, vacuum gas oils, deasphalted gas oil, and light cycle oil. Hierarchical beta zeolites, therefore, may facilitate the transport of the larger hydrocarbon molecules in these feedstocks to catalytic sites and reduce the diffusion limitations of these catalysts.

Conventional hierarchical mesoporous zeolites may be produced by a "top-down" process or a "bottom up" process. "Top-down" synthesis involves the chemical erosion of microporous zeolite beta to create mesopores. In top-down synthesis, the chemical agent used to dissolve the aluminosilicate framework to create mesopores also decreases the crystallinity of the zeolite. Traditionally, top-down synthesis is performed at temperatures around 65 degrees Celsius (° C.) as higher temperatures (e.g., 100° C.) are believed to further decrease the crystallinity of the zeolite. The decreased crystallinity of the zeolite may result in less catalytically active sites and overall decreased catalytic efficiency for the resulting hierarchical zeolite beta. Pore-directing agents may be used in top-down synthesis to protect zeolite crystallinity during the chemical treatment of the zeolites. Mesopores created by top-down synthesis may be formed in a random and unpredictable pattern on the surface of zeolite beta and may have an average pore size from 2 nm to 5 nm.

Another technique, known as "bottom-up" synthesis begins with zeolite precursors, such as a gel or solution, and builds hierarchical mesoporous zeolites around a templating agent. While bottom-up synthesis allows for more control of where the mesopores form and preserves the crystallinity of the zeolite beta, the templating agents are costly and conventionally must be used in large quantities. Templating agents of conventional hierarchical mesoporous beta zeolite production methods may be organic or inorganic. Templating agents may include, by way of non-limiting example, hydrocarbon polymers, nitrogen doped hydrocarbon polymers, tetraethylammonium hydroxide, imethoxsilylpropyldimethyloctadecyl ammonium chloride, tetrapropyl ammonium hydroxide, cetyltrimethylammonium bromide, or combinations thereof. Pore-directing agents of conventional top-down hierarchical mesoporous beta zeolite production methods may include cationic surfactants and non-ionic surfactants. Cationic surfactant pore-directing agents may include, by way of non-limiting example, dodecyltrimethylammonium, cetyltrimethylammonium, propyltrimethylammonium, tetraethylammonium, tetrapropylammonium, octyltrimethylammonium, or combinations thereof. Non-ionic surfactant pore-directing agents may include, by way of non-limiting example, monoamines, polyamines, or combinations thereof. Further, the use of templating agents or pore-directing agents also requires additional time and labor-intensive steps to separate the agents from the zeolite beta. For example, templating agents or pore-directing agents may be calcined with a zeolite precursor at temperatures greater than or equal to 300° C. for a time of at least 1 hour. After calcination, the templating agents or pore-directing agents may be burned off the zeolite to form mesopores on a zeolite.

Thus, there is an ongoing need for methods of producing hierarchical beta zeolites that overcome the problems associated with the top-down and bottom-up synthesis methods. The methods of the present disclosure satisfy these needs by creating mesoporous structures in the starting microporous beta zeolite without using expensive templating agents and without compromising the crystalline structure of the beta zeolite. In particular, the methods of the present disclosure produce a hierarchical mesoporous beta zeolite through a "hydrothermal desilication" process in combination with an ion-exchange process and an acid treatment to produce a hierarchical mesoporous beta zeolite having a molar ratio of silicon to aluminum greater than the molar ratio of silicon to aluminum of a hierarchical mesoporous beta zeolite produced through hydrothermal desilication alone. The methods of the present disclosure may include subjecting a beta zeolite, such as a microporous beta zeolite, to a hydrothermal desilication process followed by contacting a beta zeolite with an ammonium salt solution to produce an intermediate hierarchical mesoporous beta and treating the intermediate hierarchical mesoporous beta zeolite with an acidic solution to produce the hierarchical mesoporous beta zeolite. The hierarchical mesoporous beta zeolites of the present disclosure may be produced without templating agents and/or pore-directing agents. Rather, the mesopores may be formed in a beta zeolite by mixing the beta zeolite with an aqueous metal hydroxide and heating the mixture of the beta zeolite and the aqueous metal hydroxide to temperatures greater than those associated with conventional mesoporous zeolite production.

The beta zeolite particles used as the starting material in the methods of the present disclosure may be microporous beta zeolites present as a single crystal structure. The microporous beta zeolites may have an average size from 1 nm to 800 nm, such as from 1 nm to 650 nm, from 1 nm to 500 nm, from 50 nm to 800 nm, from 100 nm to 800 nm, from 200 mm to 800 nm, from 200 nm to 500 nm, from 300 nm to 800 nm, or from 50 nm to 600 nm. The average size of a beta zeolite refers to the averaged value of the size of all particles of the beta zeolite in a given catalyst. In one or more embodiments, the microporous beta zeolite that is used as the starting zeolite in the methods of the present disclosure may have a molar ratio of silicon to aluminum of at least 5, such as from 5 to 50, from 10 to 50, from 10 to 40, from 12 to 40, from 10 to 30, or from 12 to 30.

As previously discussed, the methods of the present disclosure may include subjecting a beta zeolite, such as a microporous beta zeolite, to a thermal desilication process to produce a hierarchical mesoporous structure. In particular, the method for producing the hierarchical mesoporous beta zeolite may include mixing the beta zeolite with an aqueous metal hydroxide solution and heating the mixture of beta zeolite and aqueous metal hydroxide solution. The aqueous metal hydroxide solution may include a single metal hydroxide species, or may be a combination of two or more metal hydroxide chemical species. In embodiments, the aqueous metal hydroxide solution comprises at least one alkali metal hydroxide, at least one alkali earth metal hydroxide, or combinations thereof. The aqueous metal hydroxide solution may comprise lithium hydroxide (LiOH), sodium hydroxide (NaOH), potassium hydroxide (KOH), rubidium hydroxide (RbOH), magnesium hydroxide (Mg(OH)$_2$), calcium hydroxide (Ca(OH)$_2$), strontium hydroxide (Sr(OH)$_2$), barium hydroxide (Ba(OH)$_2$), or combinations thereof. Without being limited by any particular theory, it is believed the mixing step may evenly disperse the beta zeolites and aqueous metal hydroxide solution. Mixing may include one or more of stirring, swirling, vortexing, shaking, sonicating, homogenizing, blending, or the like.

In one or more embodiments, the aqueous metal hydroxide solution may have a metal hydroxide concentration from 0.01 moles per liter (M) to 10 M, such as from 0.01 M to 5 M, from 0.01 M to 3 M, from 0.01 M to 1 M, from 0.05 M to 1 M, from 0.05 M to 0.8 M, from 0.05 M to 0.5 M, or from 0.1 M to 0.4 M. In one or more embodiments, the beta zeolite and aqueous metal hydroxide mixture may have a pH of greater than or equal to 12, such as greater than or equal to 13, from 12 to 14, or from 13 to 14.

The mixture of beta zeolite and the aqueous metal hydroxide may then be heated, where the heating causes desilication of the beta zeolite. The mixture of beta zeolite and aqueous metal hydroxide may be heated to temperatures of greater than or equal to 100 degrees Celsius (° C.), such as from 100° C. to 500° C., from 125° C. to 500° C., from 150° C. to 500° C., from 175° C. to 500° C., from 200° C. to 500° C., from 250° C. to 500° C., from 100° C. to 400° C., from 125° C. to 400° C., from 150° C. to 400° C., from 175° C. to 400° C., from 200° C. to 400° C., from 250° C. to 400° C., from 100° C. to 300° C., from 125° C. to 300° C., from 150° C. to 300° C., from 175° C. to 300° C., from 200° C. to 300° C., from 250° C. to 300° C., from 100° C. to 250° C., from 125° C. to 250° C., from 150° C. to 250° C., from 175° C. to 250° C., or from 200° C. to 250° C. The heating may be performed at an autogenous pressure.

Without being bound by theory, it is believed that heating the beta zeolite and the aqueous metal hydroxide mixture during desilication may create mesopores in the beta zeolite by preferentially extracting silicon from the zeolite framework. When the temperature is greater than or equal to 100° C., the synthetic conditions favor the crystallization of beta zeolites. During this process, the appropriate amounts of aluminum may influence hierarchical mesopore formation in the beta zeolites while preserving zeolite crystallinity. The existence of aluminum in the zeolite framework may prevent excessive silicon extraction by the alkaline solution and may maintain a zeolite framework within a locally-desilicated area, which may be recrystallized at synthetic conditions. Therefore, the crystallinity of the beta zeolite may be preserved during formation of the mesopores.

In one or more embodiments, the beta zeolite and aqueous metal hydroxide mixture may be heated for a time of greater than or equal to 1 hour, such as from 1 hour to 48 hours, from 1 hour to 30 hours, from 1 hour to 24 hours, from 1 hour to 18 hours, from 1 hour to 16 hours, from 1 hour to 12 hours, from 4 hours to 48 hours, from 4 hours to 30 hours, from 4 hours to 24 hours, from 4 hours to 18 hours, from 4 hours to 16 hours, from 4 hours to 12 hours, from 12 hours to 48 hours, from 12 hours to 30 hours, from 12 hours to 24 hours, from 12 hours to 18 hours, from 12 hours to 16 hours, from 16 hours to 48 hours, from 16 hours to 30 hours, from 16 hours to 24 hours, from 16 hours to 18 hours, from 18 hours to 48 hours, from 18 hours to 30 hours, from 18 hours to 24 hours, or from 24 hours to 48 hours. Heating the mixture of the beta zeolite and metal hydroxide solution may produce desilicated beta zeolite particles having a hierarchical pore structure comprising mesopores and micropores, as previously discussed. The desilicated beta zeolite having the hierarchical pore structure may be separated from the metal hydroxide solution. The desilicated beta zeolite may then be washed to remove excess metal hydroxide solution from the desilicated beta zeolite.

The method for producing the hierarchical mesoporous beta zeolite may further include contacting the desilicated beta zeolite with an ammonium salt, which may cause ion exchange of sodium ions in the desilicated beta zeolite with ammonium ions present in the ammonium salt solution, to produce an intermediate hierarchical mesoporous beta zeolite. Contacting the desilicated beta zeolite with the ammonium salt solution may be repeated two or more times (e.g., two times, three times, four times, etc.), as needed, in order to cause sufficient ion exchange of sodium ions with ammonium ions present in the ammonium salt solution to produce the intermediate hierarchical mesoporous beta zeolite.

The ammonium salt solution may include salts that include an ammonium cation and at least one anion, such as but not limited to nitrate, chloride, carbonate, sulfate, or combinations of these. The ammonium salt solution may include one or more of ammonium nitrate, ammonium chloride, ammonium sulfate, ammonium carbonate, or combinations thereof. In embodiments, the ammonium salt solution may include water and an ammonium salt selected from the group consisting of ammonium nitrate, ammonium chloride, ammonium sulfate, ammonium carbonate, or combinations thereof.

The ammonium salt solution may have a molarity of ammonium salts of from 0.1 moles per liter (M) to 1 M, such as from 0.1 M to 0.95 M, from 0.1 M to 0.9 M, from 0.1 M to 0.85 M, from 0.2 M to 1 M, from 0.2 M to 0.95 M, from 0.2 M to 0.9 M, from 0.2 M to 0.85 M, from 0.3 M to 1 M, from 0.3 M to 0.95 M, from 0.3 M to 0.9 M, from 0.3 M to 0.85 M, from 0.4 M to 1 M, from 0.4 M to 0.95 M, from 0.4 M to 0.9 M, from 0.4 M to 0.85 M, from 0.5 M to 1 M, from 0.5 M to 0.95 M, from 0.5 M to 0.9 M, from 0.5 M to 0.85 M, from 0.6 M to 1 M, from 0.6 M to 0.95 M, from 0.6 M to 0.9 M, from 0.6 M to 0.85 M, from 0.7 M to 1 M, from 0.7 M to 0.95 M, from 0.7 M to 0.9 M, from 0.7 M to 0.85 M, from 0.75 M to 1 M, from 0.75 M to 0.95 M, from 0.75 M to 0.9 M, or from 0.75 M to 0.85 M. Without being bound by theory, if the molarity of the ammonium salt solution is greater than 1 M, the ammonium salt solution may have a detrimental effect on structure of the intermediate hierarchical mesoporous beta zeolite. Conversely, if molarity of the ammonium salt solution is less than 0.1 M, the ammonium salt solution may not include a sufficient amount of ions to exchange the sodium cations present in the intermediate hierarchical mesoporous beta zeolite.

The desilicated beta zeolite may be contacted with the ammonium salt solution at a temperature of greater than 25° C., such as from 25° C. to 100° C., from 30° C. to 100° C., from 35° C. to 100° C., from 40° C. to 100° C., from 45° C. to 100° C., from 50° C. to 100° C., from 55° C. to 100° C., from 55° C. to 95° C., from 55° C. to 90° C., from 55° C. to 85° C., from 60° C. to 100° C., from 60° C. to 95° C., from 60° C. to 90° C., from 60° C. to 85° C., from 65° C. to 100° C., from 65° C. to 95° C., from 65° C. to 90° C., from 65° C. to 85° C., from 70° C. to 100° C., from 75° C. to 95° C., from 75° C. to 90° C., or from 75° C. to 85° C.

The desilicated beta zeolite may be contacted with the ammonium salt solution for a time of greater than or equal to 0.5 hours, such as from 0.5 hours to 48 hours, from 0.5 hours to 36 hours, from 0.5 hours to 30 hours, from 0.5 hours to 24 hours, from 0.5 hours to 18 hours, from 0.5 hours to 16 hours, from 0.5 hours to 12 hours, from 0.5 hours to 8 hours, from 0.5 hours to 4 hours, from 0.5 hours to 3 hours, from 0.5 hours to 2.5 hours, from 1 hour to 48 hours, from 1 hour to 36 hours, from 1 hour to 30 hours, from 1 hour to 24 hours, from 1 hour to 18 hours, from 1 hour to 16 hours, from 1 hour to 12 hours, from 1 hour to 8 hours, from 1 hour to 4 hours, from 1 hour to 3 hours, from 1 hour to 2.5 hours, from 1.5 hours to 48 hours, from 1.5 hours to 36 hours, from 1.5 hours to 30 hours, from 1.5 hours to 24 hours, from 1.5 hours to 18 hours, from 1.5 hours to 16 hours, from 1.5 hours to 12 hours, from 1.5 hours to 8 hours, from 1.5 hours to 4 hours, from 1.5 hours to 3 hours, from 1.5 hours to 2.5 hours.

The intermediate hierarchical mesoporous beta zeolite may have a molar ratio of silicon to aluminum of less than 12.5, such as from 1 to less than 12.5, from 1 to 12, from 1 to 11, from 1 to 10, from 1 to 9, from 1 to 8, from 1 to 7, from 1 to 6, from 1 to 5, from 2 to less than 12.5, from 2 to 12, from 2 to 11, from 2 to 10, from 2 to 9, from 2 to 8, from 2 to 7, from 2 to 6, from 2 to 5, from 3 to less than 12.5, from 3 to 12, from 3 to 11, from 3 to 10, from 3 to 9, from 3 to 8, from 3 to 7, from 3 to 6, from 3 to 5, from 4 to less than 12.5, from 4 to 12, from 4 to 11, from 4 to 10, from 4 to 9, from 4 to 8, from 4 to 7, from 4 to 6, from 5 to less than 12.5, from 5 to 12, from 5 to 11, from 5 to 10, from 5 to 9, from 5 to 8, from 5 to 7, or from 5 to 6.

The intermediate hierarchical mesoporous beta zeolite may have a total pore volume of greater than or equal to 0.3 cubic centimeters per gram ($cm^3/g$), such as from 0.3 $cm^3/g$ to 1.0 $cm^3/g$, from 0.35 $cm^3/g$ to 1.0 $cm^3/g$, from 0.4 $cm^3/g$ to 1.0 $cm^3/g$, from 0.45 $cm^3/g$ to 1.0 $cm^3/g$, from 0.5 $cm^3/g$ to 1.0 $cm^3/g$, from 0.55 $cm^3/g$ to 1.0 $cm^3/g$, from 0.3 $cm^3/g$ to 0.95 $cm^3/g$, from 0.35 $cm^3/g$ to 0.95 $cm^3/g$, from 0.4 $cm^3/g$ to 0.95 $cm^3/g$, from 0.45 $cm^3/g$ to 0.95 $cm^3/g$, from 0.5 $cm^3/g$ to 0.95 $cm^3/g$, from 0.55 $cm^3/g$ to 0.95 $cm^3/g$, from 0.3 $cm^3/g$ to 0.9 $cm^3/g$, from 0.35 $cm^3/g$ to 0.9 $cm^3/g$, from 0.4 $cm^3/g$ to 0.9 $cm^3/g$, from 0.45 $cm^3/g$ to 0.9 $cm^3/g$, from 0.5 $cm^3/g$ to 0.9 $cm^3/g$, from 0.55 $cm^3/g$ to 0.9 $cm^3/g$, from 0.3 $cm^3/g$ to 0.85 $cm^3/g$, from 0.35 $cm^3/g$ to 0.85 $cm^3/g$, from 0.4 $cm^3/g$ to 0.85 $cm^3/g$, from 0.45 $cm^3/g$ to 0.85 $cm^3/g$, from 0.5 $cm^3/g$ to 0.85 $cm^3/g$, from 0.55 $cm^3/g$ to 0.85 $cm^3/g$, from 0.3 $cm^3/g$ to 0.8 $cm^3/g$, from 0.35 $cm^3/g$ to 0.8 $cm^3/g$, from 0.4 $cm^3/g$ to 0.8 $cm^3/g$, from 0.45 $cm^3/g$ to 0.8 $cm^3/g$, from 0.5 $cm^3/g$ to 0.8 $cm^3/g$, from 0.55 $cm^3/g$ to 0.8 $cm^3/g$, from 0.3 $cm^3/g$ to 0.75 $cm^3/g$, from 0.35 $cm^3/g$ to 0.75 $cm^3/g$, from 0.4 $cm^3/g$ to 0.75 $cm^3/g$, from 0.45 $cm^3/g$ to 0.75 $cm^3/g$, from 0.5 $cm^3/g$ to 0.75 $cm^3/g$, from 0.55 $cm^3/g$ to 0.75 $cm^3/g$, from 0.3 $cm^3/g$ to 0.7 $cm^3/g$, from 0.35 $cm^3/g$ to 0.7 $cm^3/g$, from 0.4 $cm^3/g$ to 0.7 $cm^3/g$, from 0.45 $cm^3/g$ to 0.7 $cm^3/g$, from 0.5 $cm^3/g$ to 0.7 $cm^3/g$, from 0.55 $cm^3/g$ to 0.7 $cm^3/g$, from 0.3 $cm^3/g$ to 0.65 $cm^3/g$, from 0.35 $cm^3/g$ to 0.65 $cm^3/g$, from 0.4 $cm^3/g$ to 0.65 $cm^3/g$, from 0.45 $cm^3/g$ to 0.65 $cm^3/g$, from 0.5 $cm^3/g$ to 0.65 $cm^3/g$, from 0.55 $cm^3/g$ to 0.65 $cm^3/g$, from 0.3 $cm^3/g$ to 0.6 $cm^3/g$, from 0.35 $cm^3/g$ to 0.6 $cm^3/g$, from 0.4 $cm^3/g$ to 0.6 $cm^3/g$, from 0.45 $cm^3/g$ to 0.6 $cm^3/g$, from 0.5 $cm^3/g$ to 0.6 $cm^3/g$, or from 0.55 $cm^3/g$ to 0.6 $cm^3/g$, as determined according to the test methods provided in the present disclosure.

In one or more embodiments, the intermediate hierarchical mesoporous beta zeolite may have an average pore size of greater than 8 nm, as measured by BJH analysis. In embodiments, the intermediate hierarchical mesoporous beta zeolite may have an average pore size from 8 nm to 25 nm, from 8 nm to 20 nm, from 8 nm to 18 nm, from 8 nm to 16 nm, 8 nm to 12 nm, from 8 nm to 10 nm, from 10 nm to 25 nm, from 10 nm to 20 nm, from 10 nm to 18 nm, from 10 nm to 16 nm, from 10 nm to 12 nm, from 12 nm to 25 nm, from 12 nm to 20 nm, from 12 nm to 18 nm, from 12 nm to 16 nm, from 16 nm to 25 nm, or from 16 nm to 20 nm.

The method for producing the hierarchical mesoporous beta zeolite may further include calcining the intermediate hierarchical mesoporous beta zeolite. In one or more embodiments, calcining the intermediate hierarchical mesoporous beta zeolite may occur at a temperature of greater than or equal to 500° C., such as from 500° C. to 1500° C., from 500° C. to 1400° C., from 500° C. to 1300° C., from 500° C. to 1250° C., from 500° C. to 1200° C., from 500° C. to 1100° C., from 500° C. to 1000° C., from 500° C. to 900° C., from 500° C. to 800° C., from 500° C. to 750° C., from 500° C. to 700° C., or from 500° C. to 600° C.

In embodiments, calcining the intermediate hierarchical mesoporous beta zeolite may occur for a time of greater than 1 hour, such as from 1 hour to 10 hours, from 1 hour to 9 hours, from 1 hour to 8 hours, from 1 hour to 7 hours, from 1 hour to 6 hours, from 2 hours to 10 hours, from 2 hours to 9 hours, from 2 hours to 8 hours, from 2 hours to 7 hours, from 2 hours to 6 hours, from 3 hours to 10 hours, from 3 hours to 9 hours, from 3 hours to 8 hours, from 3 hours to 7 hours, from 3 hours to 6 hours, from 4 hours to 10 hours, from 4 hours to 9 hours, from 4 hours to 8 hours, from 4 hours to 7 hours, or from 4 hours to 6 hours.

The method for producing the hierarchical mesoporous beta zeolite may further include treating the intermediate hierarchical mesoporous beta zeolite with an acidic solution to produce the hierarchical mesoporous beta zeolite. Without being bound by theory, it is believed that treating the intermediate hierarchical mesoporous beta zeolite with an acidic solution may allow for the manipulation (e.g., increase) of the molar ratio of silicon to aluminum in the hierarchical mesoporous beta zeolite without decreasing the total pore volume and the average mesopore size of the hierarchical mesoporous beta zeolite.

In embodiments, the acidic solution may include a mineral acid, an organic acid, or combinations thereof. As used in the present disclosure, "mineral acids" include any acids derived from one or more inorganic compounds. Suitable examples of mineral acids may include but are not limited to hydrochloric acid, nitric acid, phosphoric acid, sulfuric acid, boric acid, hydrofluoric acid, hydrobromic acid, perchloric acid, hydroiodic acid, or combinations thereof. As used in the present disclosure, "organic acids" include organic compounds with acidic properties. Suitable examples of organic acids may include but are not limited to lactic acid, acetic acid, formic acid, citric acid, oxalic acid, uric acid, malic acid, tartaric acid, or combinations thereof.

The acidic solution may have a molarity from 0.1 M to 1 M, such as from 0.1 M to 0.9 M, from 0.1 M to 0.8 M, from 0.1 M to 0.7 M, from 0.1 M to 0.6 M, from 0.1 M to 0.5 M, from 0.15 M to 1 M, from 0.15 M to 0.9 M, from 0.15 M to 0.8 M, from 0.15 M to 0.7 M, from 0.15 M to 0.6 M, from 0.15 M to 0.5 M, from 0.2 M to 1 M, from 0.2 M to 0.9 M, from 0.2 M to 0.8 M, from 0.2 M to 0.7 M, from 0.2 M to 0.6 M, from 0.2 M to 0.5 M, from 0.25 M to 1 M, from 0.25 M to 0.9 M, from 0.25 M to 0.8 M, from 0.25 M to 0.7 M, from 0.25 M to 0.6 M, or from 0.25 M to 0.5 M. In one or more embodiments, increasing the molarity of the acidic solution increases a molar ratio of silicon to aluminum in the hierarchical mesoporous beta zeolite. Without being bound by theory, if the molarity of the acidic solution is greater than 1 M, the acidic solution may dissolve and destroy zeolite structures in the hierarchical mesoporous beta zeolite.

The intermediate hierarchical mesoporous beta zeolite may be treated with the acidic solution at a temperature of greater than 25° C., such as from 30° C. to 100° C., from 35° C. to 100° C., from 40° C. to 100° C., from 45° C. to 100° C., from 50° C. to 100° C., from 55° C. to 100° C., from 55° C. to 95° C., from 55° C. to 90° C., from 55° C. to 85° C., from 60° C. to 100° C., from 60° C. to 95° C., from 60° C. to 90° C., from 60° C. to 85° C., from 65° C. to 100° C., from 65° C. to 95° C., from 65° C. to 90° C., from 65° C. to 85° C., from 70° C. to 100° C., from 75° C. to 95° C., from 75° C. to 90° C., or from 75° C. to 85° C.

The intermediate hierarchical mesoporous beta zeolite may be treated with the acidic solution for a time of greater than or equal to 0.5 hours, such as from 0.5 hours to 48 hours, from 0.5 hours to 36 hours, from 0.5 hours to 30 hours, from 0.5 hours to 24 hours, from 0.5 hours to 18 hours, from 0.5 hours to 16 hours, from 0.5 hours to 12 hours, from 0.5 hours to 8 hours, from 0.5 hours to 4 hours, from 0.5 hours to 3 hours, from 0.5 hours to 2.5 hours, from 1 hour to 48 hours, from 1 hour to 36 hours, from 1 hour to 30 hours, from 1 hour to 24 hours, from 1 hour to 18 hours, from 1 hour to 16 hours, from 1 hour to 12 hours, from 1 hour to 8 hours, from 1 hour to 4 hours, from 1 hour to 3 hours, from 1 hour to 2.5 hours, from 1.5 hours to 48 hours, from 1.5 hours to 36 hours, from 1.5 hours to 30 hours, from 1.5 hours to 24 hours, from 1.5 hours to 18 hours, from 1.5 hours to 16 hours, from 1.5 hours to 12 hours, from 1.5 hours to 8 hours, from 1.5 hours to 4 hours, from 1.5 hours to 3 hours, or from 1.5 hours to 2.5 hours.

The hierarchical mesoporous beta zeolite produced according to the previously described methods may include a molar ratio of silicon to aluminum of greater than 10. In other words, the molar ratio of silicon to aluminum in the hierarchical mesoporous beta zeolite may be greater than the molar ratio of silicon to aluminum in the intermediate hierarchical mesoporous beta zeolite. In embodiments, the molar ratio of silicon to aluminum in the hierarchical mesoporous beta zeolite may be from 10 to 200, such as from 10 to 175, from 10 to 150, from 10 to 125, from 13 to 200, from 13 to 175, from 13 to 150, from 13 to 125, from 15 to 200, from 15 to 175, from 15 to 150, from 15 to 125, from 20 to 200, from 20 to 175, from 20 to 150, from 20 to 125, from 25 to 200, from 25 to 175, from 25 to 150, from 25 to 125, from 30 to 200, from 30 to 175, from 30 to 150, from 30 to 125, from 50 to 200, from 50 to 175, from 50 to 150, from 50 to 125, from 70 to 200, from 70 to 175, from 70 to 150, from 70 to 125, from 75 to 200, from 75 to 175, from 75 to 150, or from 75 to 125.

The total pore volume of the hierarchical mesoporous beta zeolite may represent the total sum of the volume of micropores and mesopores in the hierarchical mesoporous beta zeolite. The total pore volume of the hierarchical mesoporous beta zeolite may be greater than or equal to the total pore volume of the intermediate hierarchical mesoporous beta zeolite, as determined by NLDFT analysis. For example, if the intermediate hierarchical mesoporous beta zeolite has a total pore volume of 0.3 $cm^3/g$, the hierarchical mesoporous beta zeolite may have a total pore volume of greater than or equal to 0.3 $cm^3/g$, such as greater than or equal to 0.35 $cm^3/g$, greater than or equal to 0.4 $cm^3/g$, greater than or equal to 0.45 $cm^3/g$, greater than or equal to 0.5 $cm^3/g$, or greater than or equal to 0.55 $cm^3/g$.

The average mesopore size of the hierarchical mesoporous beta zeolite may be greater than or equal to the average mesopore size of the intermediate hierarchical mesoporous beta zeolite. For example, if the intermediate hierarchical mesoporous beta zeolite has an average mesopore size of 8 nm, the hierarchical mesoporous beta zeolite may have an average mesopore size of greater than or equal to 8 nm, such as greater 8.5 nm, greater than or equal to 9 nm, greater than or equal to 9.5 nm, or greater than or equal to 10 nm.

The hierarchical mesoporous beta zeolite may have a Brunauer-Emmett-Teller (BET) surface area of greater than or equal to 500 square meters per gram ($m^2/g$), such as greater than or equal to 510 $m^2/g$, greater than or equal to 520 $m^2/g$, greater than or equal to 525 $m^2/g$, greater than or equal to 530 $m^2/g$, greater than or equal to 540 $m^2/g$, greater than or equal to 550 m²/g, greater than or equal to 560 m²/g, greater than or equal to 570 m²/g, greater than or equal to 575 m²/g, greater than or equal to 580 m²/g, greater than or equal to 590 m²/g, or greater than or equal to 600 m²/g.

The hierarchical mesoporous beta zeolite may have a mesopore volume of greater than or equal to 0.3 cm³/g, such as greater than or equal to 0.31 cm³/g, greater than or equal to 0.32 cm³/g, greater than or equal to 0.33 cm³/g, greater than or equal to 0.34 cm³/g, or greater than or equal to 0.35 cm³/g.

It should now be understood that the methods described in the present disclosure may be applicable for producing hierarchical mesoporous beta zeolites that may have an increased molar ratio of silicon to aluminum when compare to hierarchical mesoporous beta zeolites produced using hydrothermal desilication by itself or other known techniques. Hierarchical mesoporous beta zeolites having an increased molar ratio of silicon to alumina may provide better stability during the harsh conditions of catalytic operations, such as those associated with oil-refining and petrochemical applications, than typical hierarchical mesoporous beta zeolites. Moreover, the hierarchical mesoporous beta zeolites of the present disclosure have increased hydrophobicity and are therefore highly compatible with hydrophobic hydrocarbon molecules, which are prevalent in many catalytic operations, such as those associated with oil-refining and petrochemical applications.

EXAMPLES

The various embodiments of methods for producing hierarchical mesoporous beta zeolites will be further clarified by the following examples. The examples are illustrative in nature, and should not be understood to limit the subject matter of the present disclosure.

Comparative Example 1: Microporous Beta Zeolites

Beta zeolite (Comparative Example 1, "C. Ex. 1") were used to produce intermediate hierarchical mesoporous beta zeolites. The beta zeolites of C. Ex. 1 had a silicon to aluminum ratio of 14, a micropore volume of 0.29 cm³/g, and a total pore volume of 0.33 cm³/g.

Example 2: Synthesis of Intermediate Hierarchical Mesoporous Beta Zeolites from Beta Zeolites In Example 2, the beta zeolite of C. Ex. 1 was used to produce an intermediate hierarchical mesoporous beta zeolite (Example 2; "Ex. 2"). First, 3.7 grams (g) of the beta zeolites of C. Ex. 1 were mixed with 100 milliliters (mL) of 0.2 M sodium hydroxide to produce a mixture. The mixture was then heated at a temperature of 150° C. for a time of 21 hours.

The beta zeolites were then contacted with 0.8 M ammonium nitrate ($NH_4NO_3$) solution at a temperature of 80° C. for a time of 2 hours three times to produce intermediate hierarchical mesoporous beta zeolites of Ex. 2. The contacting was repeated three times in order to ensure suitable ion-exchange of sodium ions with ammonium ions in the intermediate hierarchical mesoporous beta zeolites. The intermediate hierarchical mesoporous beta zeolites of Ex. 2 were then dried and calcined at a temperature of 550° C. for a time of 5 hours.

The properties of both the beta zeolites (C. Ex. 1) and the intermediate hierarchical mesoporous beta zeolites (Ex. 2) are shown below in Table 1.

TABLE 1

Properties of the Beta Zeolites of C. Ex. 1 and the Intermediate Hierarchical Mesoporous Beta Zeolites of Ex. 2

| Sample Number | Si/Al | $d_a$ (nm) | $S_{BET}$ (m²/g) | $S_{ext}$ (m²/g) | $V_{mic}$ (cm³/g) | $V_{total}$ (cm³/g) | Acidity (mmol/g) | $T_{max}$ (° C.) |
|---|---|---|---|---|---|---|---|---|
| C. Ex. 1 | 14 | — | 647 | 114 | 0.29 | 0.33 | 0.73 | 315 ± 2 |
| Ex. 2 | 10 | 10.0 | 611 | 197 | 0.28 | 0.58 | 0.79 | 313 ± 2 | where Si/Al represents the molar ratio of silicon to aluminum; $d_a$ represents the average mesopore size; $S_{BET}$ represents the BET surface area; $S_{ext}$ represents the external surface area; $V_{mic}$ represents the micropore volume; $V_{total}$ represents the total pore volume; Acidity represents the total acidity in millimoles per gram (mmol/g); and $T_{max}$ represents peak ammonia desorption temperature in a temperature-programmed desorption (TPD) curve.

Examples 3-9: Synthesis of Hierarchical Mesoporous Beta Zeolites from Intermediate Hierarchical Mesoporous Beta Zeolites The intermediate hierarchical mesoporous beta zeolites of Ex. 2 were then treated with nitric acid ($HNO_3$) solutions having varying molarities at a temperature of 80° C. for a time of 2 hours to remove aluminum and produce the hierarchical mesoporous beta zeolites (Examples 3-9, "Ex. 3-9"). The properties of the hierarchical mesoporous beta zeolites of Ex. 3-9 are shown below in Table 2.

TABLE 2

Properties of the Hierarchical Mesoporous Beta Zeolites of Examples 3-9

| Sample No. | $C_{HNO3}$ (M) | Si/Al | $d_a$ (nm) | $S_{BET}$ (m²/g) | $S_{ext}$ (m²/g) | $V_{mic}$ (cm³/g) | $V_{total}$ (cm³/g) | Acidity (mmol/g) | $T_{max}$ (° C.) |
|---|---|---|---|---|---|---|---|---|---|
| Ex. 3 | 0.10 | 13 | 10.3 | 592 | 199 | 0.28 | 0.59 | 0.78 | 327 ± 3 |
| Ex. 4 | 0.15 | 17 | 10.0 | 611 | 205 | 0.28 | 0.59 | 0.70 | 340 ± 5 |
| Ex. 5 | 0.20 | 26 | 10.0 | 608 | 197 | 0.27 | 0.59 | 0.54 | 347 ± 3 |

TABLE 2-continued

Properties of the Hierarchical Mesoporous Beta Zeolites of Examples 3-9

| Sample No. | $C_{HNO3}$ (M) | Si/Al | $d_a$ (nm) | $S_{BET}$ (m²/g) | $S_{ext}$ (m²/g) | $V_{mic}$ (cm³/g) | $V_{total}$ (cm³/g) | Acidity (mmol/g) | $T_{max}$ (° C.) |
|---|---|---|---|---|---|---|---|---|---|
| Ex. 6 | 0.25 | 33 | 10.3 | 609 | 196 | 0.27 | 0.60 | 0.36 | 330 ± 3 |
| Ex. 7 | 0.33 | 74 | 10.4 | 629 | 202 | 0.29 | 0.64 | 0.23 | 323 ± 3 |
| Ex. 8 | 0.50 | 86 | 10.7 | 597 | 204 | 0.29 | 0.65 | 0.20 | 316 ± 3 |
| Ex. 9 | 1.0 | 110 | 10.8 | 628 | 207 | 0.29 | 0.67 | Below Detection Limit | Outside Detection Limit | where $C_{HNO3}$ (M) represents the molarity of the nitric acid (HNO₃) solution; Si/Al represents the molar ratio of silicon to aluminum; $d_a$ represents the average mesopore size; $S_{BET}$ represents the BET surface area; $S_{ext}$ represents the external surface area; $V_{mic}$ represents the micropore volume; $V_{total}$ represents the total pore volume; Acidity represents the total acidity; and $T_{max}$ represents peak ammonia desorption temperature in a temperature-programmed desorption (TPD) curve.

As shown in Table 2, each of the hierarchical mesoporous beta zeolites of Ex. 3-9 had molar ratios of silicon to aluminum that were greater than 10, regardless of the molarity of nitric acid (HNO₃) solution used during their formation. In fact, it was observed that increasing the molarity of the HNO₃ solution increases a molar ratio of silicon to aluminum in a hierarchical mesoporous beta zeolite. In addition to increasing the molar ratio of silicon to aluminum, this method preserved both the total pore volume ($V_{total}$) and the average mesopore size ($d_a$) of the hierarchical mesoporous beta zeolites of Ex. 3-9 when compared to the intermediate hierarchical mesoporous beta zeolite of Ex. 2. Together, these data show that the methods presented in the present disclosure are suitable for producing a hierarchical mesoporous beta zeolite with an improved molar ratio of silicon to aluminum and a preserved mesopore size and total pore volume, which indicate that the hierarchical mesoporous beta zeolite may be incorporated in various catalytic applications.

A first aspect of the present disclosure may be directed to a method for producing a hierarchical mesoporous beta zeolite. The method includes mixing a beta zeolite with an aqueous metal hydroxide solution; heating the beta zeolite and the aqueous metal hydroxide mixture at a temperature of greater than or equal to 100° C., wherein the heating causes desilication of the beta zeolite to produce a desilicated beta zeolite; contacting the desilicated beta zeolite with an ammonium salt solution to produce an intermediate hierarchical mesoporous beta zeolite comprising (a) a molar ratio of silicon to aluminum of less than 12.5, (b) a total pore volume of greater than or equal to 0.3 cm³/g, and (c) an average mesopore size of greater than 8 nm, wherein the contacting causes ion exchange of sodium ions with ammonium ions in the intermediate hierarchical mesoporous beta zeolite; and treating the intermediate hierarchical mesoporous beta zeolite with an acidic solution to produce the hierarchical mesoporous beta zeolite comprising (e) a molar ratio of silicon to aluminum of greater than 12.5, (f) a total pore volume of greater than or equal to the total pore volume of the intermediate hierarchical mesoporous beta zeolite, and (g) an average mesopore size of greater than or equal to the average mesopore size of the hierarchical mesoporous beta zeolite.

A second of the present disclosure may include the first aspect, further comprising increasing a molarity of the acidic solution, wherein increasing the molarity of the acidic solution increases a molar ratio of silicon to aluminum in the hierarchical mesoporous beta zeolite.

A third aspect of the present disclosure may include the first or second aspects, wherein the ammonium salt solution comprises ammonium nitrate, ammonium chloride, ammonium sulfate, ammonium carbonate, or combinations thereof.

A fourth aspect of the present disclosure may include any of the first through third aspects, wherein the ammonium salt solution comprises a molarity from 0.1 M to 1.0 M.

A fifth aspect of the present disclosure may include any of the first through fourth aspects, further comprising contacting the intermediate hierarchical mesoporous beta zeolite at a temperature from 25° C. to 100° C.

A sixth aspect of the present disclosure may include any of the first through fifth aspects, further comprising contacting the intermediate hierarchical mesoporous beta zeolite for a time of greater than or equal to 0.5 hours.

A seventh aspect of the present disclosure may include any of the first through sixth aspects, further comprising contacting the intermediate hierarchical mesoporous beta zeolite two or more times.

An eighth aspect of the present disclosure may include any of the first through seventh aspects, wherein the acidic solution comprises a mineral acid.

A ninth aspect of the present disclosure may include the eighth aspect, wherein the mineral acid comprises hydrochloric acid, nitric acid, phosphoric acid, sulfuric acid, boric acid, hydrofluoric acid, hydrobromic acid, perchloric acid, hydroiodic acid, or combinations thereof.

A tenth aspect of the present disclosure may include any of the first through ninth aspects, wherein the acidic solution comprises an organic acid.

An eleventh aspect of the present disclosure may include the tenth aspect, wherein the organic acid comprises lactic acid, acetic acid, formic acid, citric acid, oxalic acid, uric acid, malic acid, tartaric acid, or combinations thereof.

A twelfth aspect of the present disclosure may include any of the first through eleventh aspects, wherein the acidic solution comprises a molarity from 0.1 M to 1.0 M.

A thirteenth aspect of the present disclosure may include any of the first through twelfth aspects, further comprising treating the intermediate hierarchical mesoporous beta zeolite with the acidic solution at a temperature from 25° C. to 100° C.

A fourteenth aspect of the present disclosure may include any of the first through thirteenth aspects, further comprising treating the intermediate hierarchical mesoporous beta zeolite with the acidic solution for a time of greater than or equal to 0.5 hours.

A fifteenth aspect of the present disclosure may include any of the first through fourteenth aspects, wherein the hierarchical mesoporous beta zeolite comprises a total pore volume of greater than 0.3 cm³/g and (g) an average mesopore size of greater than 8 nm.

A sixteenth aspect of the present disclosure may include any of the first through fifteenth aspects, wherein the hierarchical mesoporous beta zeolite comprises a BET surface area of greater than or equal to 500 m²/g.

A seventeenth aspect of the present disclosure may include any of the first through sixteenth aspects, wherein hierarchical mesoporous beta zeolite comprises a mesopore volume of greater than or equal to 0.3 cm³/g.

An eighteenth aspect of the present disclosure may include any of the first through seventeenth aspects, wherein the hierarchical mesoporous beta zeolite is produced without a templating agent or a pore-directing agent.

A nineteenth aspect of the present disclosure may include any of the first through eighteenth aspects, further comprising calcining the hierarchical mesoporous beta zeolite at a temperature of greater than or equal to 500° C. for a time of greater than or equal to 1 hour.

A twentieth aspect of the present disclosure may be directed to a method for increasing a molar ratio of silicon to aluminum in a hierarchical mesoporous beta zeolite. The method includes contacting a beta zeolite having a hierarchical mesoporous structure with an ammonium nitrate solution comprising a molarity from 0.1 M to 1.0 M at a temperature from 25° C. to 100° C. for a time of greater than or equal to 1 hour to produce an intermediate hierarchical mesoporous beta zeolite comprising (a) a molar ratio of silicon to aluminum of less than 12.5, (b) a total pore volume of greater than or equal to 0.3 cm³/g, and (c) an average mesopore size of greater than 8 nm, wherein contacting causes ion exchange of sodium ions with ammonium ions in the hierarchical mesoporous beta zeolite; calcining the intermediate hierarchical mesoporous beta zeolite at a temperature of greater than or equal to 500° C. for a time of greater than or equal to 1 hour; and treating the intermediate hierarchical mesoporous beta zeolite with an acidic solution comprising a molarity from 0.1 M to 1.0 M at a temperature from 25° C. to 100° C. for a time of greater than or equal to 1 hour to produce the hierarchical mesoporous beta zeolite comprising (e) a molar ratio of silicon to aluminum of greater than 12.5, (f) a total pore volume of greater than or equal to the total pore volume of the hierarchical mesoporous beta zeolite, and (g) an average mesopore size of greater than or equal to the average mesopore size of the hierarchical mesoporous beta zeolite.

A twenty-first aspect of the present disclosure may include the twentieth aspect, wherein the hierarchical mesoporous beta zeolite is produced without a templating agent or a pore-directing agent.

A twenty-second aspect of the present disclosure may include the twentieth or twenty-first aspects wherein the hierarchical mesoporous beta zeolite comprises (f) a total pore volume greater than or equal to 0.5 cm³/g and (g) an average mesopore size of greater than 10 nm.

A twenty-third aspect of the present disclosure may include any of the twentieth through twenty-second aspects, further comprising mixing the beta zeolite with an aqueous metal hydroxide solution and heating the beta zeolite and the aqueous metal hydroxide mixture at a temperature of greater than or equal to 100° C., wherein the heating causes desilication of the beta zeolite.

A twenty-fourth aspect of the present disclosure may include any of the twentieth through twenty-third aspects, wherein the acidic solution comprises nitric acid.

A twenty-fifth aspect of the present disclosure may be directed to a method for increasing a molar ratio of silicon to aluminum in a hierarchical mesoporous beta zeolite. The method includes contacting a beta zeolite having a hierarchical mesoporous structure with an ammonium nitrate solution to produce an intermediate hierarchical mesoporous beta zeolite comprising (a) a molar ratio of silicon to aluminum of less than 12.5, (b) a total pore volume of greater than or equal to 0.3 cm³/g, and (c) an average mesopore size of greater than 8 nm, wherein contacting causes ion exchange of sodium ions with ammonium ions in the hierarchical mesoporous beta zeolite; and treating the intermediate hierarchical mesoporous beta zeolite with an acidic solution to produce the hierarchical mesoporous beta zeolite comprising (e) a molar ratio of silicon to aluminum of greater than 12.5, (f) a total pore volume of greater than or equal to the total pore volume of the hierarchical mesoporous beta zeolite, and (g) an average mesopore size of greater than or equal to the average mesopore size of the hierarchical mesoporous beta zeolite.

It should be understood that any two quantitative values assigned to a property may constitute a range of that property, and all combinations of ranges formed from all stated quantitative values of a given property are contemplated in the present disclosure.

Having described the subject matter of the present disclosure in detail and by reference to specific embodiments, it is noted that the various details described in the present disclosure should not be taken to imply that these details relate to elements that are essential components of the various embodiments described in the present disclosure, even in cases where a particular element is illustrated in each of the drawings that accompany the present description. Rather, the claims appended hereto should be taken as the sole representation of the breadth of the present disclosure and the corresponding scope of the various embodiments described in the present disclosure. Further, it will be apparent that modifications and variations are possible without departing from the scope of the appended claims.

For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in the present disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A method for producing a hierarchical mesoporous beta zeolite, the method comprising:
    providing a beta zeolite;
    desilicating the beta zeolite to produce a desilicated beta zeolite, where desilicating the beta zeolite comprises:
        mixing the beta zeolite with an aqueous metal hydroxide solution; and
        heating the beta zeolite and the aqueous metal hydroxide mixture at a temperature of greater than or equal to 100° C., wherein the heating causes desilication of the beta zeolite to produce the desilicated beta zeolite;
    contacting the desilicated beta zeolite with an ammonium salt solution to produce an intermediate hierarchical mesoporous beta zeolite having (a) a molar ratio of silicon to aluminum of less than 12.5, (b) a total pore volume of greater than or equal to 0.3 cm$^3$/g, and (c) an average mesopore size of greater than 8 nm, wherein the contacting causes ion exchange of sodium ions with ammonium ions in the intermediate hierarchical mesoporous beta zeolite; and
    treating the intermediate hierarchical mesoporous beta zeolite with an acidic solution to produce the hierarchical mesoporous beta zeolite having (e) a molar ratio of silicon to aluminum of greater than 12.5, (f) a total pore volume of greater than or equal to the total pore volume of the intermediate hierarchical mesoporous beta zeolite, and (g) an average mesopore size of greater than or equal to the average mesopore size of the hierarchical mesoporous beta zeolite.

2. The method of claim 1, further comprising increasing a molarity of the acidic solution, wherein increasing the molarity of the acidic solution increases a molar ratio of silicon to aluminum in the hierarchical mesoporous beta zeolite.

3. The method of claim 1, wherein the ammonium salt solution comprises ammonium nitrate, ammonium chloride, ammonium sulfate, ammonium carbonate, or combinations thereof.

4. The method of claim 1, wherein the ammonium salt solution has a molarity from 0.1 M to 1.0 M.

5. The method of claim 1, further comprising contacting the intermediate hierarchical mesoporous beta zeolite at a temperature from 25° C. to 100° C. for a time of greater than or equal to 0.5 hours.

6. The method of claim 1, wherein the acidic solution comprises a mineral acid.

7. The method of claim 6, wherein the mineral acid comprises hydrochloric acid, nitric acid, phosphoric acid, sulfuric acid, boric acid, hydrofluoric acid, hydrobromic acid, perchloric acid, hydroiodic acid, or combinations thereof.

8. The method of claim 1, wherein the acidic solution comprises an organic acid.

9. The method of claim 1, wherein the acidic solution comprises a molarity from 0.1 M to 1.0 M.

10. The method of claim 1, further comprising treating the intermediate hierarchical mesoporous beta zeolite with the acidic solution at a temperature from 25° C. to 100° C. for a time of greater than or equal to 0.5 hours.

11. The method of claim 1, wherein the hierarchical mesoporous beta zeolite comprises a (f) total pore volume of greater than 0.3 cm$^3$/g and (g) an average mesopore size of greater than 8 nm.

12. The method of claim 1, wherein the hierarchical mesoporous beta zeolite comprises a BET surface area of greater than or equal to 500 m$^2$/g and a mesopore volume of greater than or equal to 0.3 cm$^3$/g.

13. The method of claim 1, wherein the hierarchical mesoporous beta zeolite is produced without a templating agent or a pore-directing agent.

14. The method of claim 1, further comprising calcining the hierarchical mesoporous beta zeolite at a temperature of greater than or equal to 500° C. for a time of greater than or equal to 1 hour.

* * * * *